April 9, 1963  C. R. RUSSELL  3,085,060
NUCLEAR REACTOR SAFETY DEVICE
Filed March 2, 1959
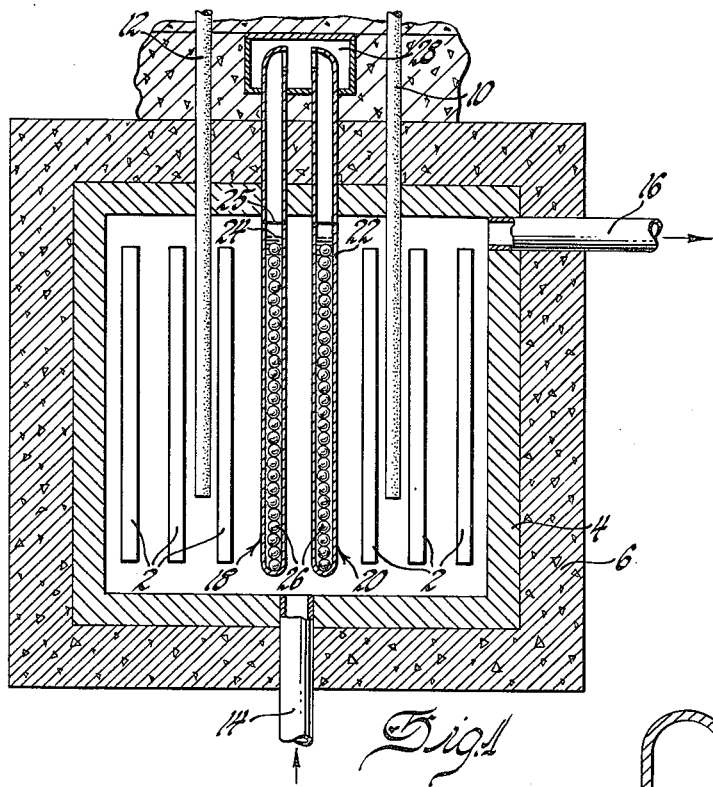
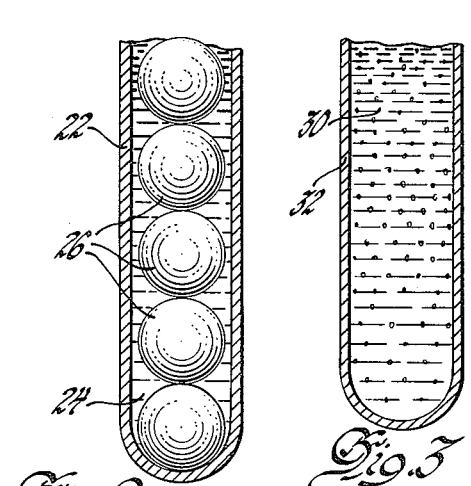
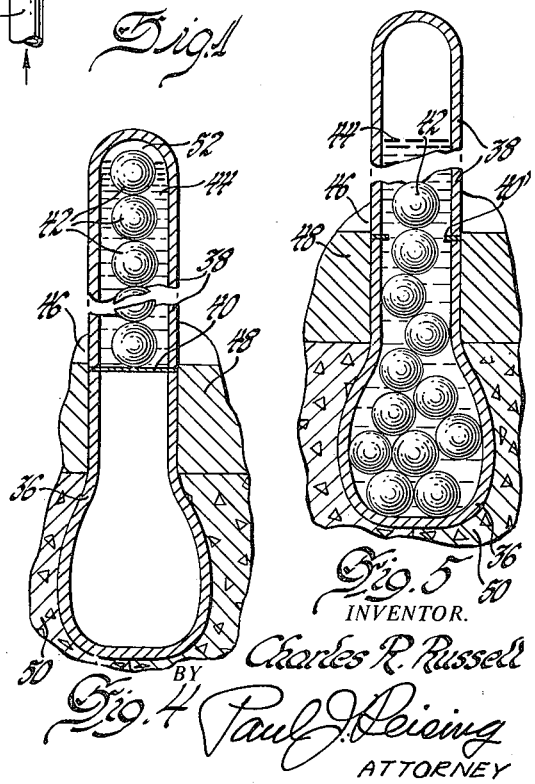
INVENTOR.
Charles R. Russell
BY Paul J. Peising
ATTORNEY 3,085,060
NUCLEAR REACTOR SAFETY DEVICE
Charles R. Russell, St. Clair Shores, Mich., assignor to General Motors Corporation, Detroit, Mich., a corporation of Delaware
Filed Mar. 2, 1959, Ser. No. 796,345
5 Claims. (Cl. 204—193.2)

This invention relates to nuclear reactors and, more particularly, to a safety device for nuclear reactors which provides improved reactor control and self-actuated reactor shut-down upon the occurrence of an excessively high heat output within the reactor.

Present nuclear reactor control and safety devices comprise one or a number of rods constructed of neutron-absorbing material which are movable into and out of the reactor core by actuating means generally consisting of: (1) a device for detecting neutron flux or temperature within the reactor core; (2) electrical circuits for amplifying, transmitting and measuring the signal from the detector device; and (3) an electric motor or the like to drive and position the rods in accordance with the electrical signal. Such a system is relatively elaborate and delicate, requires an external supply of electrical energy and, hence, is subject to various types of malfunction. Also because such a control system operates through components external of the reactor, it is subject to tampering or to miscalibration or inaccurate setting through human error. Since it is well known that nuclear reactors can, in fact, increase their power and temperature output at a very rapid rate under certain conditions, and therefore cause extensive damage and possibly the release of highly hazardous radioactive materials, it has long been recognized that a simplified and improved means for preventing unauthorized power and temperature excursions is an important objective.

It is an object of the present invention to provide an improved nuclear reactor safety device which affords reliable means for controlling the rate of nuclear reaction and for terminating the reaction in the event that excessively high temperatures develop. Another object of the invention is the provision of a nuclear reactor having a self-contained and self-actuating safety device which will cause a cessation of power output upon the occurrence of a predetermined excessively high temperature within the reactor core. Still another object of the invention is the provision of a nuclear reactor safety device which has no parts external of the reactor vessel, which requires no external power source and, hence, which is not subject to tampering or to inoperativeness by way of power source failure. Other objects and advantages of the invention will appear more clearly from the following detailed description of the preferred embodiments thereof made with reference to the accompanying drawings in which:

FIGURE 1 is a side view in section of a nuclear reactor embodying the invention;

FIGURE 2 is a view in large scale of a portion of the safety device shown in FIGURE 1;

FIGURE 3 is a side view in section showing another embodiment of the invention;

FIGURE 4a is a side view in section showing the frangible diaphragm of FIGURE 4; and FIGURES 4 and 5 are side views in section showing still another embodiment of the invention.

In general, the nuclear reactor safety device of the present invention comprises a closed, elongated casing or tube partially filled with a mixture of fissionable material and a liquid having an appreciable vapor pressure at a temperature slightly above the desired operating temperature of the reactor. The fissionable material within the tube forms a part of the critical mass within the reactor core and the unfilled portion of the tube extends outside the reactor core. The device is constructed and arranged within the reactor such that when the core temperature rises above the desired level, the liquid vapor pressure forces fissionable material within the tube outside the core zone, thereby immediately reducing the neutron flux within the reactor core and therefore the power output and temperature.

Referring now to the drawings, in FIGURE 1 there is shown a reactor comprising a plurality of fuel elements 2 of suitable fissionable material, for example, uranium, plutonium or U-235 enriched uranium which form the reactor core enclosed within the graphite or other reflector layer 4 and concrete shielding 6. Conventional movable control rods 10 and 12 of a high cross section material such as cadmium extend through the shielding and reflector into the reactor core to provide means for controlling the precise power output of the reactor. Inlet and outlet pipes 14 and 16, respectively, provide means for circulation of water or other moderator coolant through the reactor core.

In accordance with the present invention the reactor core includes safety devices 18 and 20 each of which consists of a tube 22 of stainless steel or other suitable metal closed at the bottom end thereof and partially filled with a material 24 which is a liquid at the normal operating temperature of the reactor plus small individual masses of fissionable material preferably in the form of uniformly sized small spherical pellets 26. One of the advantages to using pellets of uniform spherical size is to assure against settling out of the fissile material within the liquid. A thin stainless steel or other metal diaphragm 25 designed to rupture at a predetermined pressure is secured within the tube just above the liquid and seals the bottom portion of the tube from the upper portion. The space between the diaphragm and the liquid is for expansion of the liquid and for accumulation of any gases produced within the device during reactor operation. The upper end of each of the tubes is turned inwardly and communicates with a closed chamber 28 suitably shielded by a mass of dense concrete. A vacuum or an inert gas at low pressure may be used in the upper portions of the tubes and in the chamber 28. Pellets 26 are of the same fissionable material as that of the fuel elements 2 and form a part of the critical mass of the material within the reactor core. The selection of liquid will, of course, depend upon the temperature level at which shut-down is desired, it being required that the liquid have a sufficient vapor pressure at the desired shut-down temperature to rupture the diaphragm and force one or more of the pellets 26 of fissionable material up and out of the tubes and hence out of the core zone and into the chamber 28. Suitable materials for the liquid are the alkali metals, lithium, sodium, potassium, rubidium, cesium, sodium-potassium alloys, for example, 56% (by weight) sodium and 44% potassium, mercury, sulphur, and water.

If desired, the fissionable material within the safety device may be in a form other than pellets. Such an embodiment is shown in FIGURE 3, the mixture 30 within the tube 32 consisting of a stable suspension of about 23% by weight $UO_2$ particles and the remainder sodium-potassium alloy containing about 22% sodium and 78% potassium. A solution of the fissile material in a suitable liquid, for example water, may also be used.

In FIGURE 4 there is illustrated another embodiment of the invention which comprises a closed tube of stainless steel having an enlarged or bulb-shaped lower portion 36 which is separated from the upper portion 38 by a thin diaphragm 40, the upper portion of the tube containing a mixture of fissionable material 42 plus suitable liquid 44, for example an alkali metal. This upper portion of the safety device is positioned within the core zone 46 above the reflector 48 of the reactor, the fissionable material within the device forming a part of the critical mass, and the lower bulb portion 36 is positioned below and outside the core zone within the reactor shielding 50. A gas space 52 is left at the top of the casing to allow for expansion and for the accumulation of any gases produced within the device during reactor operation. As in the case of the diaphragm 25 shown in FIGURE 1, the frangible diaphragm 40 is such that it ruptures upon the occurrence of the predetermined pressure differential between the upper and lower portions of the tube. It may, for example, be a thin stainless steel disc (see FIGURE 4a) with a circular portion 41 adjacent to and concentric with its periphery which is of still thinner section designed to rupture at a 40-pound-per-square-inch pressure differential, the liquid within the upper portion of the tube being selected to provide somewhat in excess of 40 pounds per square inch vapor pressure at the temperature level at which reactor shut-down is desired. Hence, at below this predetermined temperature level the reactor operates normally; however, upon a temperature excursion which exceeds the predetemined level, the liquid within the upper portion of the safety device causes rupture of the diaphragm thereby allowing exit of a portion of the fissionable material into the bulb portion 36 of the safety device and therefore outside the core zone. This is shown in FIGURE 5, the ruptured diaphragm being indicated at 40'. The exit of this amount of fissionable material reduces the mass within the core zone and automatically reduces the neutron flux below the level required to sustain the reactor in operation. The fuel elements, reflector and other components of the reactor in which this embodiment is used can be substantially the same as those described above with reference to FIGURE 1. If desired, the attitude of the safety device within the reactor can be other than vertical. For example, the embodiment shown in FIGURE 4 can be arranged on the horizontal with the bulb portion extending out of the side of the core zone.

The safety device may be used in either thermal neutron or fast reactors, it being particularly advantageous for use in the latter since one of its characteristics, that of very rapid and reliable response to a change in core temperature, is especially required in safety devices for fast reactors.

While the invention has been described with reference to particular embodiments thereof, it is understood that changes and modifications may be made, all within the full and intended scope of the claims which follow.

I claim:

1. In a nuclear reactor, a safety device which functions to reduce the rate of nuclear reaction upon the occurrence of a predetermined excessive temperature within the core zone of said reactor, said device comprising an elongated casing positioned with one portion thereof within the core zone of said reactor and another portion thereof outside the core zone of said reactor, a thin diaphragm in said casing sealing the one portion thereof from the other and constructed to rupture at a predetermined pressure corresponding to said excessive temperature, and a mixture containing a plurality of pellets of fissile material plus a liquid in that portion of said casing which is within the core zone, said fissile material forming a part of the critical fissile mass within the core zone and said liquid having sufficient vapor pressure at said predetermined excessive temperature to rupture said diaphragm and propel at least a portion of said fissile material into that portion of said casing which is outside the core zone to thereby reduce the fissile mass and therefore the rate of nuclear reaction within the core zone.

2. In a nuclear reactor, a safety device which functions to reduce the rate of nuclear reaction upon the occurrence of a predetermined excessive temperature within the core zone of said reactor, said device comprising an elongated cylindrical casing positioned with one portion thereof within the core zone of said reactor and another portion thereof outside the core zone of said reactor, a thin diaphragm in said casing sealing the one portion thereof from the other and having sufficient strength to withstand any pressures developed below said excessive temperature, and a plurality of generally spherical, uniformly sized pellets of fissile material plus a liquid in that portion of said casing which is within the core zone, said pellets forming a part of the critical fissile mass within the core zone and said liquid having sufficient vapor pressure at said predetermined excessive temperature to rupture said diaphragm and propel at least a portion of said pellets into that portion of said casing which is outside the core zone to thereby reduce the fissile mass and therefore the rate of nuclear reaction within the core zone.

3. In a nuclear reactor, a safety device which functions to reduce the rate of nuclear reaction upon the occurrence of a predetermined excessive temperature within the core zone of said reactor, said device comprising a metal tube vertically positioned with a lower portion thereof within the core zone of said reactor and an upper portion thereof outside the core zone of said reactor, said upper portion communicating with a chamber located outside the core zone, a thin diaphragm in said tube sealing the lower portion thereof from the upper portion and having sufficient strength to withstand any pressures developed below said excessive temperature, and a mixture of fissile material and a liquid in that portion of said tube which is within the core zone, said fissile material forming a part of the critical fissile mass within the core zone and said liquid having sufficient vapor pressure at said predetermined excessive temperature to rupture said diaphragm and propel at least a portion of said fissile material into said chamber to be trapped therein and thereby reduce the fissile mass and therefore the rate of nuclear reaction within the core zone.

4. In a nuclear reactor, a safety device which functions to reduce the rate of nuclear reaction upon the occurrence of a predetermined excessive temperature within the core zone of said reactor, said device comprising a sealed elongated casing vertically positioned with an upper portion thereof within the core zone of said reactor and a lower portion thereof outside the core zone of said reactor, a diaphragm in said casing sealing the upper portion from the lower portion thereof and constructed to rupture at a predetermined pressure in said upper portion, and a composition containing fissile material plus a liquid in the upper portion of said casing which is within the core zone, said fissile material forming a part of the critical fissile mass within the core zone and said liquid having sufficient vapor pressure at said predetermined excessive temperature to rupture said diaphragm and thereby release at least a portion of said fissile material into the lower portion of said casing which is outside the core zone to reduce the fissile mass and therefore the rate of nuclear reaction within the core zone.

5. In a nuclear reactor, a safety device which functions to reduce the rate of nuclear reaction upon the occurrence of a predetermined excessive temperature within the core zone of said reactor, said device comprising a sealed metal casing positioned with one portion thereof within the core zone of said reactor and an enlarged portion thereof outside the core zone of said reactor, a diaphragm in said casing sealing the one portion thereof from the other portion and constructed to rupture at a predetermined pressure, and a mixture containing a plurality of pellets of fissile material plus a liquid partially filling that portion of said casing within the core zone, said fissile material forming a part of the critical fissile mass within the core zone and said liquid having sufficient vapor pressure at said predetermined excessive temperature to rupture said diaphragm and release at least a portion of said fissile material into the enlarged portion of said casing which is outside the core zone to reduce the fissile mass and therefore the rate of nuclear reaction within the core zone.

References Cited in the file of this patent

UNITED STATES PATENTS

| | | |
|---|---|---|
| 760,443 | Fulton | May 24, 1904 |
| 1,736,984 | Sheats | Nov. 26, 1949 |

FOREIGN PATENTS

| | | |
|---|---|---|
| 555,328 | Canada | Apr. 1, 1958 |

OTHER REFERENCES

Nuclear Science and Engineering, vol. 2 (November 1957), page 806.